US010679180B2

(12) United States Patent
Hoover et al.

(10) Patent No.: US 10,679,180 B2
(45) Date of Patent: Jun. 9, 2020

(54) TRANSITIONING INVENTORY SEARCH FROM LARGE GEOGRAPHIC AREA TO IMMEDIATE PERSONAL AREA

(71) Applicant: Capital One Services, LLC, McLean, VA (US)

(72) Inventors: Jason Hoover, Grapevine, TX (US); Qiaochu Tang, The Colony, TX (US); Micah Price, Plano, TX (US); Geoffrey Dagley, McKinney, TX (US); Stephen Wylie, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/012,876

(22) Filed: Jun. 20, 2018

(65) Prior Publication Data

US 2019/0392375 A1    Dec. 26, 2019

(51) Int. Cl.
| G06K 9/00 | (2006.01) |
| G06Q 10/00 | (2012.01) |
| G06Q 10/08 | (2012.01) |
| G06K 9/62 | (2006.01) |
| G06F 16/245 | (2019.01) |

(52) U.S. Cl.
CPC ......... *G06Q 10/087* (2013.01); *G06F 16/245* (2019.01); *G06K 9/6267* (2013.01)

(58) Field of Classification Search
CPC ................................ G06K 9/00; G06Q 10/00
USPC ....................................................... 705/28
See application file for complete search history.

(56) References Cited

U.S. PATENT DOCUMENTS

| 9,978,071 | B2* | 5/2018 | Kursar ............... G06Q 30/0261 |
| 2008/0167933 | A1* | 7/2008 | Hoffman ............. G06Q 10/087 705/28 |
| 2013/0144460 | A1 | 6/2013 | Ricci |
| 2013/0286048 | A1* | 10/2013 | Sternitzke ......... G06F 17/30041 345/633 |
| 2016/0086029 | A1* | 3/2016 | Dubuque ........... G06K 9/00536 382/159 |
| 2017/0181115 | A1* | 6/2017 | Kim ...................... H04W 60/04 |

(Continued)

OTHER PUBLICATIONS

Davies, "An App That Can Instantly Identify Any Car (At Least Half the Time)," www.wired.com, Dec. 16, 2014, 9 pages.

(Continued)

*Primary Examiner* — Russell S Glass
(74) *Attorney, Agent, or Firm* — DLA Piper LLP (US)

(57) ABSTRACT

In one aspect, the present disclosure relates to a method for improved efficiency of an inventory management system. The method can include: performing a first inventory search of inventory data stored in a database using search criteria; receiving, from a beacon sensor, inventory data broadcast from a plurality of beacons; performing a second inventory search by correlating the inventory data broadcast from the plurality of beacons with results of the first inventory search; receiving image data from a camera; performing image classification on the image data to determine one or more class labels for an inventory item within the field-of-view of the camera; performing a third inventory search by correlating the class labels with results of the second inventory search; and presenting results of the third inventory search to a user.

20 Claims, 5 Drawing Sheets

(56) References Cited

U.S. PATENT DOCUMENTS

2017/0300970 A1\* 10/2017 Yoder ................ G06Q 30/0259

OTHER PUBLICATIONS

Reddy, et al., "Systems and Methods for Car Shopping Using Messaging Framework", U.S. Appl. No. 15/915,863, filed Mar. 8, 2018, 30 pages.
Vasisht, et al. "Machine Learning Artificial Intelligence System for Identifying Vehicles", U.S. Appl. No. 15/915,947, filed Mar. 8, 2018, 92 pages.

\* cited by examiner

TRANSITIONING INVENTORY SEARCH FROM LARGE GEOGRAPHIC AREA TO IMMEDIATE PERSONAL AREA

CROSS-REFERENCE TO RELATED APPLICATIONS

The present application relates to U.S. patent application Ser. No. 15/915,863 entitled "SYSTEMS AND METHODS FOR CAR SHOPPING USING MESSAGING FRAMEWORK" and filed on Mar. 8, 2018. The present application also relates to U.S. patent application Ser. No. 15/915,947 entitled "MACHINE LEARNING ARTIFICIAL INTELLIGENCE SYSTEM FOR IDENTIFYING VEHICLES" and filed on Mar. 8, 2018. Each of the foregoing applications is hereby incorporated by reference in its entirety.

BACKGROUND

Various types of online inventory management systems may include user interfaces (UIs) for searching inventory across a relatively large geographic area. For example, vehicle shopping apps and websites allow users to search for vehicles within a five (5), ten (10), or twenty (20) mile radius. If a user is interested in a particular vehicle, the app/website may allow the user to request an online vehicle review, obtain one or more auto loan quotes, or retrieve additional details about that particular vehicle. Searching for inventory using existing inventory management systems may involve multiple network requests between the user's client device and a server device. The user experience may degrade on user devices with limited network access and small screens, such as smartphones and other mobile devices.

SUMMARY

According to one aspect, the present disclosure relates to a method for improved efficiency of an inventory management system. The method can include: receiving, at a user device, one or more inventory search criteria, the inventory search criteria including at least a location criterion; performing a first inventory search of inventory data stored in a database using the search criteria, the inventory data including a location for each of a plurality of inventory items, the first inventory search including at least a geospatial search of the stored inventory data using the location criterion; receiving, from a beacon sensor of the user device, inventory data broadcast from a plurality of beacons, each of the beacons being collocated with a corresponding one of the plurality of inventory items; performing a second inventory search by correlating the inventory data broadcast from the plurality of beacons with results of the first inventory search; receiving image data from a camera, the image data including image data for an inventory item within a field-of-view of the camera; performing image classification on the image data to determine one or more class labels for the inventory item within the field-of-view of the camera; performing a third inventory search by correlating the class labels with results of the second inventory search; and presenting, by the user device, results of the third inventory search, the presented information including inventory data retrieved from the database during the first inventory search.

In some embodiments, performing the first inventory search may include: sending a search request including the search criteria to a server device, wherein the server device performs the geospatial search of the stored inventory data. In some embodiments, the stored inventory data can include a unique identifier for each of the plurality of inventory items, and performing the second inventory search includes matching unique identifiers broadcast from the plurality of beacons to unique identifiers within the results of the first inventory search. In some embodiments, the stored inventory data can include descriptive information for each of the plurality of inventory items, and presenting the results of the third inventory search includes presenting the descriptive information for one or more of the plurality of inventory items. In some embodiments, the stored inventory data can include a sales price for each of the plurality of inventory items.

In some embodiments, the method may include: storing the results of the first inventory search to a non-volatile memory of the user device, wherein presenting the results of the third inventory search includes using the results of the first inventory search stored to the non-volatile memory of the user device. In some embodiments, the location criterion can include at least one of: a location and search radius; one or more zip codes; and one or more locality names. In some embodiments, the location criterion can include coordinates determined by a location sensor of the user device. In some embodiments, the plurality of inventory items may include a plurality of vehicles. In some embodiments, the stored inventory data can include a Vehicle Identification Number (VIN) for each of the plurality of vehicles. In some embodiments, the stored inventory data may include a make, model, and year for each of the plurality of vehicles. In some embodiments, the stored inventory data may include third party review information for one or more of the plurality of inventory items.

According to another aspect, the present disclosure relates to a method for improved efficiency of an inventory management system. The method can include: determining a location of a user device using a location sensor; receiving search results from a server device, the first search results including information for a plurality of inventory items within a predetermined distance from the determined location, the first search results including a unique identifier and descriptive information for each of the inventory items; receiving signals broadcast from a plurality of beacons, each of the beacons collocated with a corresponding one of the plurality of inventory items, each of the beacons broadcasting a unique identifier for the corresponding inventory item; narrowing the search results using the unique identifiers broadcast from the plurality of beacons; and presenting a user interface (UI) to display the narrowed search results to a user of the user device.

In some embodiments, the method can include: receiving image data from a camera of the user device; performing image classification on the image data to determine one or more class labels for an inventory item within the field-of-view of the camera; further narrowing the search results using the one or more class labels; and presenting the UI to display the further narrowed search results to the user. In some embodiments, the method can include sending a search request including the location to the server device. In some embodiments, the server device may be coupled to a database configured to store inventory data for the plurality of inventory items. In some embodiments, the stored inventory data can include a sales price and a location for each of the plurality of inventory items. In some embodiments, the plurality of inventory items can include a plurality of vehicles. In some embodiments, the stored inventory data may include a Vehicle Identification Number (VIN) for each of the plurality of vehicles.

According to another aspect, the present disclosure relates to a device including a beacon sensor, a camera, a processor, and a user application. The user application may be configured for execution on the processor to: receive information for a plurality of inventory items by receiving, using the beacon sensor, signals broadcast from a plurality of beacons, each of the beacons collocated with a corresponding one of the plurality of inventory items, each of the beacons broadcasting a unique identifier and descriptive information for the corresponding inventory item; receive image data from the camera; perform image classification on the image data to determine one or more class labels for an inventory item within the field-of-view of the camera; select a first one of the plurality of inventory items using the one or more class labels; and present a user interface (UI) to display the descriptive information for the first one of the plurality of inventory items.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present disclosure can improve existing inventory management systems by allowing users to transition from searching inventory across a relatively large geographic area (e.g., a 10 mile radius), to searching within a relatively small geographic area (e.g., within a 100 meter radius), and then to searching inventory in the user's immediate vicinity (e.g., directly in front of the user). A multi-level search process may utilize one or more sensors of a user device, such as a Global Positioning System (GPS) receiver to receive location data, a Bluetooth Low Energy (BLE) radio to receive beacon data, and a camera to capture images of the user's immediate vicinity. As the search area transitions from larger to smaller, inventory information may be cached in the user device to reduce the number of requests between the user device and a remote inventory management system or server device. Embodiments of the present disclosure can improve the efficiency of existing inventory management systems. For example, embodiments of the present disclosure may reduce load on a server device by decreasing the number and/or frequency of search requests that must be processed by the server. As another example, embodiments of the present disclosure can provide more timely and efficient search results to the user by allowing inventory information to be pushed to a user device in advance of the user initiating an inventory search. As yet another example, embodiments of the present disclosure can improve computer vision-trained machine learning using previously obtained inventory information.

Although certain embodiments of the present disclosure are described herein using examples related to vehicle shopping apps and websites, a skilled artisan would understand that the systems and methods sought to be protected herein can be used to improve many different types of systems for managing and searching inventory.

Figure 1:
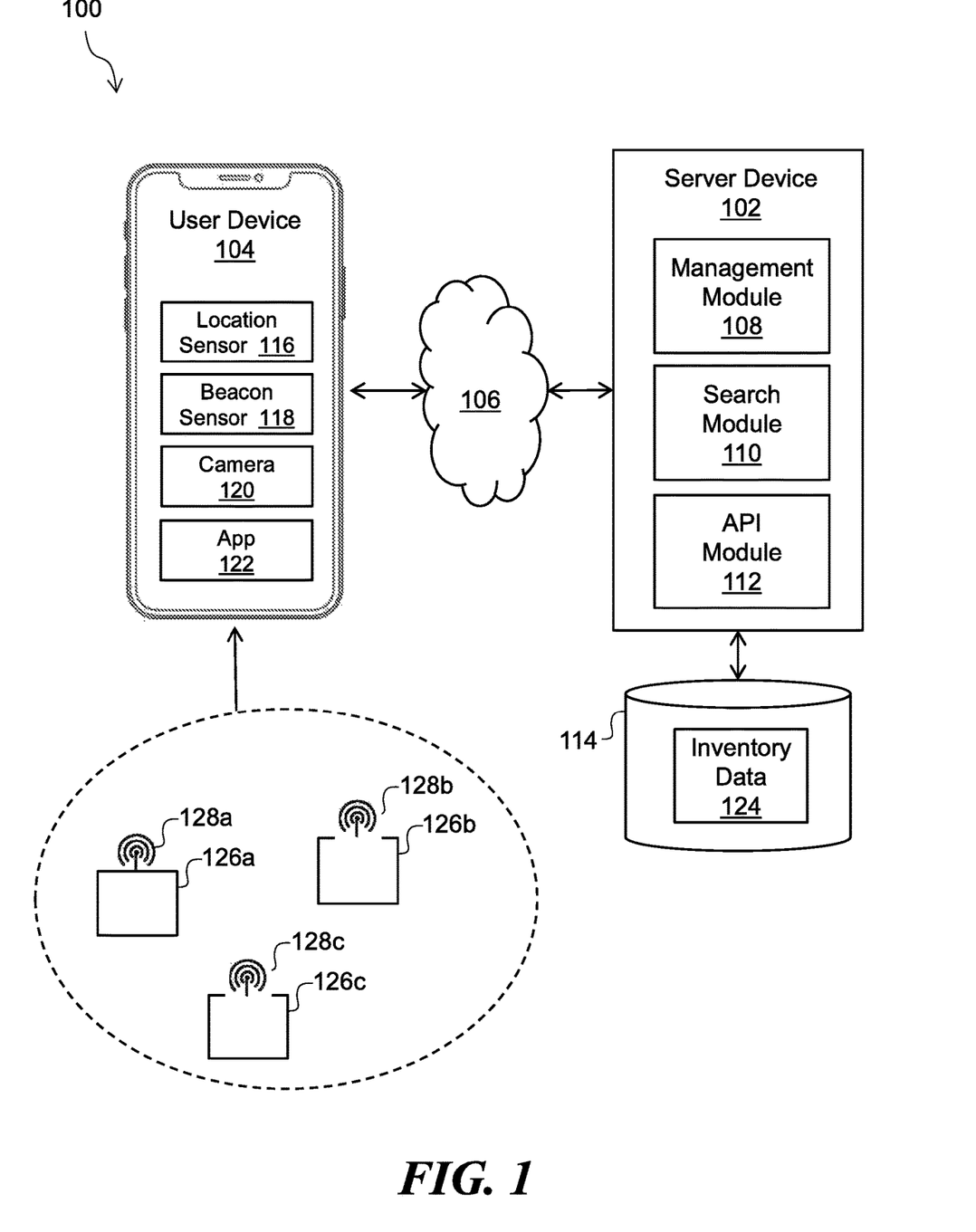
FIG. 1 is a diagram of a system having a server device and one or more user devices, according to some embodiments of the present disclosure.

FIG. 1 shows an illustrative system 100 having a server device 102 and one or more user devices 104, according to some embodiments of the present disclosure. The illustrative server device 102 can include an inventory management module 108, an inventory search module 110, and an Application Programming Interface (API) module 112. The server device 102 may include or otherwise be operatively coupled to a database 114. The server device 102 and/or database 114 may be part of an inventory management system, according to some embodiments. Illustrative user device 104 can be operatively coupled to server device 102 via one or more computer networks 106, and can include a location sensor (e.g., a GPS receiver) 116, a beacon sensor (e.g., a BLE radio) 118, a camera 120, and one or user applications ("apps") 122. User devices 104 may be provided as a smartphone, tablet, or other type of mobile computing device. The server device components (e.g., modules 108-112) and user device components (e.g., components 116-122) may include any suitable combination of hardware and/or software configured to perform the processing described herein.

Referring to server device 102, inventory management module 108 may be configured to manage inventory data 124, which may be stored in database 114. For example, an administrator may add, remove, and modify stored inventory data 124. In some embodiments, inventory data 124 may be distributed among one or more owners of the inventory data (or inventory items) in one or more independent databases or storage systems. Inventory data 124 may include information about one or more inventory items 126a, 126b, 126c, etc. (126 generally). In some embodiments, inventory data 124 may include a unique identifier, a location, and descriptive information for each item of inventory 126. Inventory location may be expressed, for example, as a street address or as coordinates (e.g., latitude and longitude values). Descriptive information can include one or more attributes that describe the item of inventory. In some embodiments, inventory 126 may correspond to a plurality of vehicles, and inventory data 124 can include, for each vehicle, a unique vehicle identification number (VIN), a vehicle location (e.g., the street address or coordinates of a dealership lot where the vehicle is located), the sales price, and descriptive information such as the vehicle make, model, year, trim, and optional features.

For clarity, only three inventory items 126a, 126b, and 126c are shown in FIG. 1, however the systems and methods disclosed herein can be used to efficiently search inventory having an arbitrary number of items (e.g., thousands or millions of items). Moreover, inventory items 126 can be located or "spread" across an arbitrarily large geographic area. For example, in a vehicle shopping application, inventory 126 can include vehicles located at dealerships in various cities and states.

In some embodiments, server device 102 may access third party review information for one or more of the inventory items. For example, server device 102 may retrieve information for a particular vehicle from a third party vehicle review website. Server device 102 can store or cache third party review information in database 114.

In some embodiments, server device 102 may obtain bank loan quotes (i.e., interest rates and terms) for particular users and inventory items. For example, server device 102 may request loan information directly from one or more bank computer networks or from a service that aggregates loan quotes from multiple different banks.

Inventory search module 110 may be configured to receive inventory search requests from user devices 104. A search request can include one or more search criteria. In some embodiments, a search request may include a location criterion specifying a geographic area over which the search should be conducted. For example, a search request may include a location and a search radius defining a circular geographic area to search. The location may be specified as a street address or as latitude/longitude coordinates. As another example, a search request may include one or more zip codes in which to search for inventory. As yet another example, a search request may include one or more locality names to search (e.g., state and/or city names). In addition to a location criterion, the search request can include keywords, categories, ranges, or other inventory-related criteria. For example, in a vehicle shopping app, a search request may include one or more of: keywords for vehicle make and model, a range of model years, trim options, and a price range.

The search module 110 can use the search criteria to generate one or more database queries and run the queries against the database 114 to obtain a list of inventory items that match the search criteria. The search module 100 can prepare search results based on the database queries and return the search results to the requesting user device 104. In some embodiments, the inventory search module 110 may generate a geospatial search based on a location search criterion. As used herein, the term "geospatial search" refers to any geolocation-based database search or query including but not limited to a "geofencing"-type search.

The API module 112 may provide one or more interfaces via which user devices 104, among other systems, can interact with server modules 108, 110. In some embodiments, API module 112 may be configured to receive requests in one or more formats, such as Extensible Markup Language (XML), JavaScript Object Notation (JSON), or Protocol Buffers (Protobuf). In some embodiments, API module 112 can include a Hypertext Transfer Protocol (HTTP) server or a gRPC Remote Procedure Call (gRPC) server configured to receive requests from user devices 104 or other systems, route the requests to an appropriate module (e.g., module 108 or 110), and then send a response back to the requesting device/system.

User devices 104 may include smartphones, tablets, or other mobile devices configured to run an app 122 for searching inventory. App 122 may correspond to a native app installed on a user device or to a website or web app that runs within a web browser. App 122 may communicate with the server device 102 and may receive data from sensors 116, 118, and 120. In some embodiments, app 122 is configured to perform a "multi-level" inventory search, as described next, allowing users to efficiently locate and retrieve relevant inventory information.

In a first-level search, app 122 may send a search request to server device 102. The search request may be initiated by the user or automatically by app 122. For example, app 122 may automatically request information about nearby inventory when it is opened. In some embodiments, app 122 can automatically request inventory information for one or more nearby automobile dealerships and store the resulting information on the user device 104. If the user subsequently visits one of these dealerships, app 122 can use the previously stored inventory information to allow browsing/searching inventory without having to connect to server 102. The search request can include a location criterion among other search criteria. The location criterion can include, for example, a location and search radius, where the location can be determined using location sensor 116 (e.g., GPS) or provided as user input. As another example, the location criterion can include one or more zip codes or one or more locality names provided as user input. In response to the search request, app 122 may receive search results from server device 102. The search results can include information for one or more of the inventory items 126 that match the search criteria. In some embodiments, the search results can include, for each matching inventory item, a unique identifier, a location, descriptive information. In some embodiments, the information included in the search results may be relatively lightweight data sufficient to identify the type of objects or a particular object. The amount of data obtained in the search results may be based on the number of inventory items obtained and/or the type or bandwidth of a communication connection. In some embodiments, the search results may also include, for each inventory item, review information obtained from a third party system. App 122 may present the results of the first search to the user using a suitable user interface (UI). In some embodiments, app 122 may store or cache search results in non-volatile memory of the user device 104.

In a vehicle shopping application, an example of a first-level search may include searching for a particular vehicle make (e.g., "TOYOTA"), model (e.g., "CAMRY"), range of model year (e.g., "between 2013 and 2017"), price range (e.g., "less than X dollars"), and within a particular radius (e.g., 10 miles) of their current location determined using location sensor 116. First-level search results can include, for example, dozens or hundreds of results located across a relatively large geographic area (e.g., more than 300 square miles).

In a second-level search, app 122 may provide more localized inventory results using beacons. In some embodiments, a beacon can be generalized to a particular area, such as a beacon associated with an automobile dealership. In other embodiments, a beacon can be specific to a particular inventory item. In particular, each inventory item 126a, 126b, 126c, etc. may be affixed or otherwise collocated with a respective beacon 128a, 128b, 128c, etc. (128 generally). Beacon sensor 118 can be configured to listen for signals broadcast from beacons 128. In some embodiments, beacons 128 may use a broadcast using Bluetooth Low Energy (BLE) technology, which is a wireless personal area network technology used for transmitting data over relatively short distances (e.g., less than 100 meters). Each beacon 128 can include a BLE transmitter to broadcast small packets of data (referred to as "advertisements") at a regular interval (e.g., every 100 milliseconds). These packets can be received and processed by a BLE receiver, such as beacon sensor 118. The particular data transmitted by a beacon 128 may be programmable. In some embodiments, each beacon 128 may be programmed or otherwise configured to broadcast a unique identifier for the respective inventory item 126 to which the beacon is affixed/collocated. For example, in a vehicle shopping application, each beacon 128 may be affixed to a particular vehicle and configured to broadcast that vehicle's unique VIN.

Figure 2:
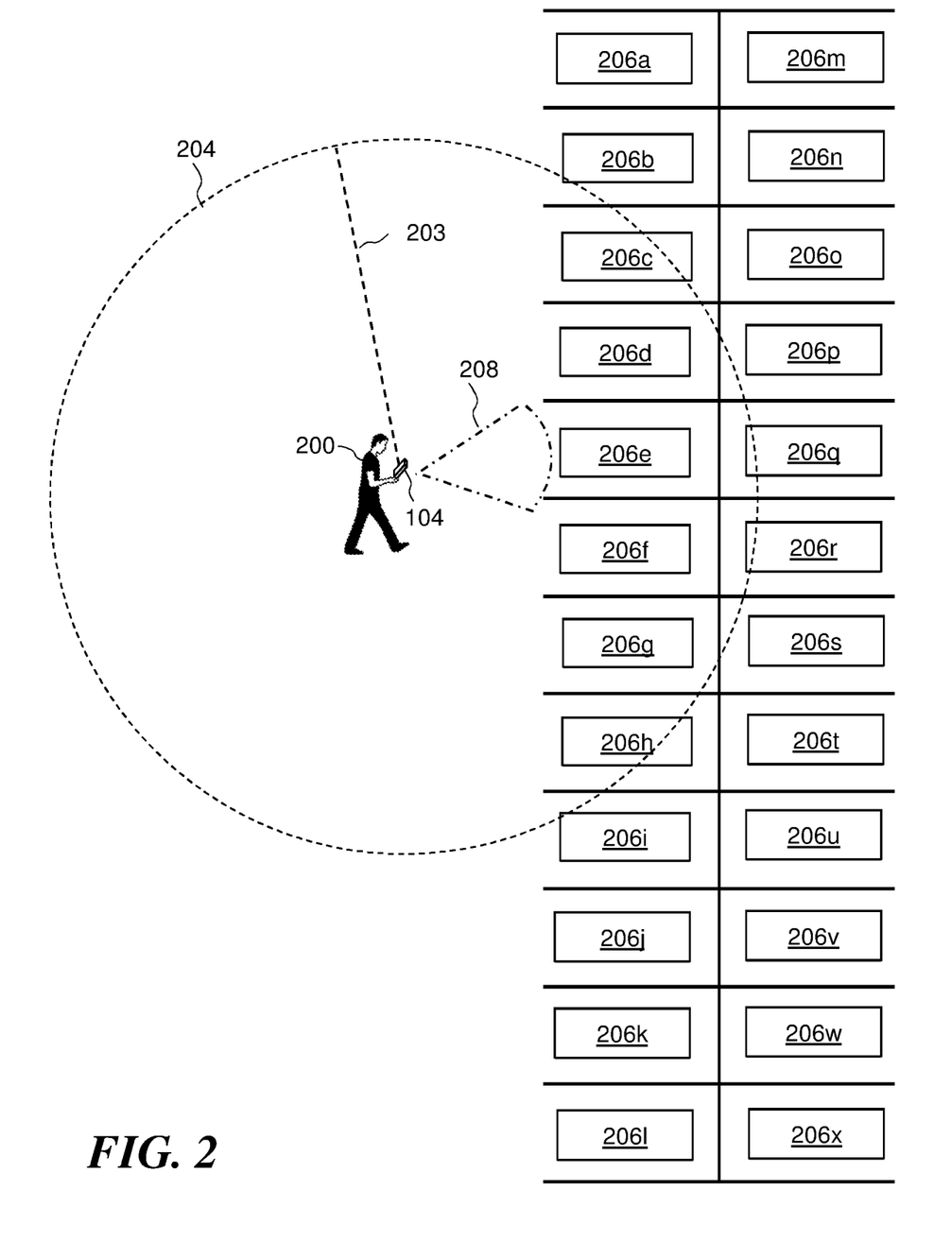
FIG. 2 is a diagram illustrating how a user can search for inventory, according to some embodiments of the present disclosure.

FIG. 2 illustrates how beacons can be used to search for inventory to within a relatively small geographic area around the user (e.g., within a 100 meter radius of the user). A user 200 with a user device 104 is shown standing or walking near a plurality of inventory items 206a, 206b, ..., 206x (206 generally). The inventory items 206 may correspond to vehicles on a dealership lot, or to any other type of inventory. Each inventory item 206 may be affixed/collocated with a beacon configured to transmit data (to promote clarity in the drawings, the beacons are not shown in FIG. 2). User device 104 can include a beacon sensor (e.g., sensor 118 in FIG. 1) capable of receiving transmitted beacon data. Each beacon may transmit data omnidirectionally at a range that is similar to all other beacons. Thus, user device 104 can effectively "see" those beacons that are within a circular area 204 around user device 104 defined by a radius 203. In some embodiments, radius 203 may be approximately one hundred (100) meters.

App 122 (FIG. 1) can use the received beacon data to determine nearby inventory. In some embodiments, received beacon data may include detailed information about each inventory item 206, such as vehicle make, model, year, and trim. In other embodiments, received beacon data may include unique inventory identifiers which the app 122 can use to retrieve detailed inventory information. For example, app 122 may correlate the received beacon data (e.g., unique identifiers) with previously stored inventory information, such as inventory information retrieved from the server during a first-level search. Thus, app 122 can determine detailed information about nearby inventory without having to connect to a server device, which may be difficult or impossible in certain situations (e.g., in areas with limited cellular coverage). In other embodiments, app 122 may use received beacon data to request detailed inventory information from the server. App 122 can present a UI allowing the user to browse and/or search nearby inventory.

In some embodiments, app 122 can provide even further localized inventory results using computer vision techniques (sometimes referred to herein as a "third-level search"). In particular, user device 104 can include a camera (e.g., camera 120 in FIG. 1) having a field-of-view 208. User 200 can aim the camera at a particular inventory item 206e and the camera can capture or generate an image of that item ("image data"). App 122 or other component of user device 104 can perform image classification on the image data to determine one or more class labels for the inventory item 206e. In some embodiments, user device 104 may utilize a computer vision-trained machine learning model to classify an inventory item 206 within the camera's field-of-view 208. For example, in a vehicle shopping application, user device 104 may determine class labels corresponding to the make, model, year, and color of a vehicle within the field-of-view 208.

In some embodiments, app 122 can use information retrieved from a first- or second-level search in order to more efficiently or effectively classify an inventory item 206 within the camera's field-of-view 208. For example, if, based on beacon data, app 122 determines that only one nearby vehicle has a blue exterior and the vehicle captured by the camera is also blue, then app 122 can identify the captured vehicle based on beacon data without having to execute a machine learning algorithm. As another example, if, based on inventory information determined during the "first-level" search (e.g., automatically when the app opens), app 122 determines that only one nearby vehicle has an orange exterior and the vehicle captured by the camera is also orange, then app 122 can identify the captured vehicle based on previously stored inventory information without having to perform machine learning. Thus, according to some embodiments, app 122 may reduce processing on, and increasing the efficiency of, the user device. In some embodiments, various data of the inventory information may be used to improve efficiency and effectiveness of a machine learning model used to classify an object in the camera's field-of-view 208. In some embodiments, if the data of previously obtained inventory information indicates vehicles of only a certain make (or model, etc.) are included in the inventory, then weights or confidences in image processing may be adjusted to more efficiently classify the object. For example, when the inventory information is limited to a single or relatively few makes of vehicles, a confidence or threshold associated with an object classified during image processing as one of the single or relatively few makes of vehicles, etc. can be adjusted to more efficiently and effectively classify the vehicle. In this example, certain potential makes or models classified with relatively low confidence during image processing can be rejected earlier during processing due to a mismatch with the previously obtained inventory information.

In some embodiments, app 122 can correlate the class labels with the results of a first- or second-level search in order to identify and present information for the specific inventory item that the user is interested in. In some embodiments, class labels may be matched against descriptive information (previously received from the server device) for each inventory item in the second-level search results. If there are multiple potential matches, probabilistic techniques and heuristics can be employed to determine a "best match," meaning the particular inventory item that is most likely within the camera's field-of-view. For example, in a vehicle shopping application, if the second-level search narrowed down the list of inventory items to three (3) vehicles each having the same make and model but different colors, then image classification for color—the distinguishing feature—may be used to identify the particular vehicle the user is interested in. After identifying a specific inventory item, app 122 can present various information about that item to the user 200. For example, app 122 may present descriptive information about the item based on the stored inventory data 124 (FIG. 1) previously received from the server device. As another example, app 122 may present to the user review information obtained from a third party review website, or bank loan quotes.

It will be appreciated that the multi-level search technique described herein allows users to retrieve information about a specific inventory item without the user having to access that inventory item's unique identifier. For example, in a vehicle shopping application, a user can retrieve information about a particular vehicle without having to physically access the VIN imprinted on the dashboard, door frame, or other part of the vehicle.

Figure 3:
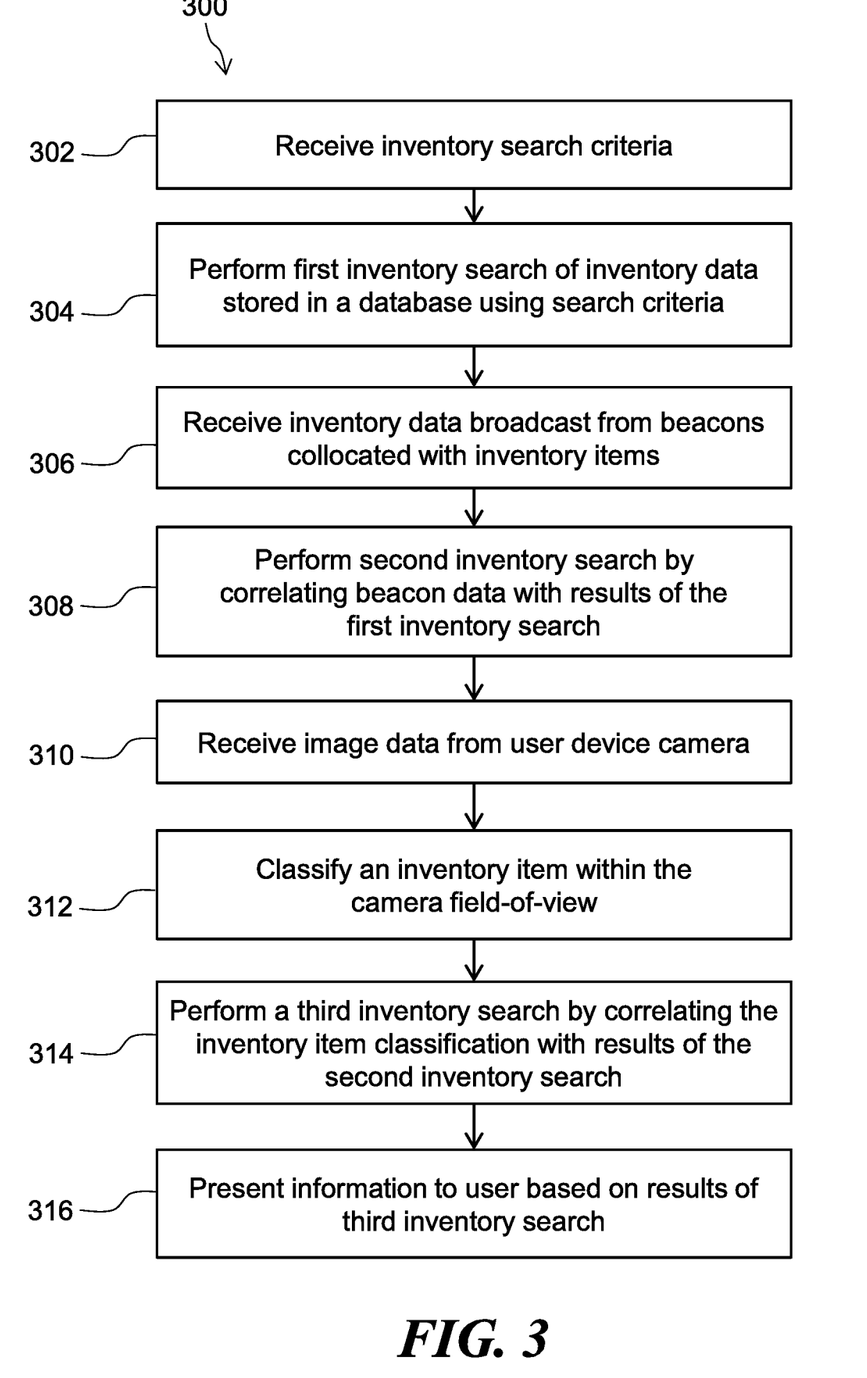
FIG. 3 is a flow diagram showing processing that may occur within the system of FIG. 1, according to some embodiments of the present disclosure.

FIG. 3 is a flow diagram showing processing that may occur within the system 100 of FIG. 1, according to some embodiments of the present disclosure. An illustrative method 300 can be implemented within user device 104 and, more particularly, within app 122.

At block 302, inventory search criteria may be received. The search criteria can include a location criterion along with keywords, categories, ranges, or other inventory-related search criteria. In some embodiments, the location criterion may include a location determined by a location sensor (e.g., a GPS receiver) of a user device. For example, when opened, app 122 may automatically determine a current location of the user device. In some embodiments, search criteria may be provided as user input.

At block 304, a first inventory search may be performed of inventory data stored in a database using the search criteria. In some embodiments, app 122 may initiate the first inventory search automatically, for example when app 122 is opened. In some embodiments, a geospatial search of the inventory data may be performed using the location criterion. In some embodiments, the first inventory search may be performed by a server device. For example, referring to FIG. 1, user device 104 may send a request with the search criteria to server device 102. The API module 112 can receive and route the request to search module 110. Search module 110 can, in turn, use the search criteria to query stored inventory data 124 and generate a list of search results. The results of the first search, which can include unique identifiers and descriptive information for a plurality of inventory items, can be returned to user device 104. In some embodiments, user device 104 may store or cache the search results to non-volatile memory. Storing/caching inventory information on the user device can provide several advantages. For example, the stored/cached information can later be used to allow a user to browse/search inventory even the user device has limited (or no) connectivity to the server. As another example, the number of requests generated by the user device and processed by the server device may be reduced because the app 122 may be able to fetch detailed inventory information from local storage instead of the server device. In some embodiments, results of the first inventory search may be presented to the user. In some embodiments, the results of the first inventory search may be complete, meaning the results include sufficient information to present to the user. In other embodiments, the results may be incomplete, meaning the app may need to request additional information from the server device prior to presenting to the user.

In some embodiments, the user device (or app running thereon) may narrow the results of the first inventory search in response to user input or automatically. For example, in the case of a vehicle shopping app, the user device may automatically detect that the user is nearby or on a dealership lot (e.g., using GPS data). In response, the user device may use geofencing techniques to narrow the list of inventory items (e.g., vehicles) to only those items located at that dealership, and present the narrowed list to the user for browsing/searching. In some embodiments, beacons may be used to broadcast information about which dealership lot the user is near/at and use this information to filter the list of inventory items.

At block 306, inventory data may be received from a plurality of beacons. Each of the beacons may be affixed/collocated with a respective inventory item and configured to broadcast data about that item. In some embodiments, each beacon may broadcast a unique identifier for the inventory item to which it is affixed/collocated. In some embodiments, the broadcast data may be received using a beacon sensor of a user device (e.g., sensor 118 of FIG. 1).

At block 308, a second inventory search may be performed by correlating the inventory data broadcast from the plurality of beacons to the results of the first inventory search. For example, unique inventory identifiers broadcast by the beacons may be matched against the unique inventory identifiers retrieved from the server device during the first search. In some embodiments, the second inventory search may narrow the results of the first inventory search. In some embodiments, results of the second inventory search may be presented to the user.

At block 310, image data can be received from a camera of the user device. For example, the image data may be received in response to the user aiming the camera at a particular inventory item. At block 312, an inventory item within the camera's field-of-view may be classified using a computer vision-trained machine learning model. In particular, image classification may be performed on the image data to determine one or more class labels for the inventory item within the camera's field-of-view. For example, in a vehicle shopping application, machine learning can be used to determine class labels for vehicle make, model, year, and color.

At block 314, a third inventory search can be performed by correlating the inventory image classification labels with results of the second inventory search. In some embodiments, classification information may be matched against each inventory item in the second search results to determine which particular inventory item is within (or most likely within) the camera's field-of-view. In some embodiments, results of the first or second inventory search may be used to improve object recognition and/or the image classification machine learning processing (such as described above in conjunction with FIG. 2), improving the efficiency of the user device.

At block 316, information for the particular inventory item may be displayed or otherwise presented to the user. For example, in a vehicle shopping app, a vehicle, make, model, year, trim, and sales price may be displayed. In some embodiments, either automatically or at the request of the user, vehicle review information and/or one or more bank loan quotes for the vehicle may be displayed. The inventory information presented can include information retrieved from the database during the first inventory search (i.e., during the processing of block 304). In some embodiments, this information may be retrieved from non-volatile memory (e.g., a cache) of the user device.

In some embodiments, the processing of blocks 306-316 may performed locally by the user device without requiring a network connection (e.g., without requiring a cellular or WiFi connection). Thus, for example, the illustrative method 300 can allow a user to begin inventory search over a relatively large geographic when the user device has a "good" network connection (e.g., high bandwidth and low latency), while automatically narrowing down these search results as the user moves into proximity of one or more inventory item without requiring a network connection.

In some embodiments, the "first" inventory search as described above may be omitted in part or in whole. In particular, one or more of the beacons could be configured to broadcast descriptive or static information for the corresponding inventory item, along with the unique identifier. For example, a beacon could broadcast the make, model, year, and trim for a vehicle to which it is affixed. Once a user identifies a particular inventory item they are interested in, the user device can retrieve additional or dynamic information (e.g., pricing and review information) from a server using the unique identifier. In some embodiments, a beacon could have its own internet connection allowing the beacon to search for the vehicle listing information of the vehicle the beacon is attached to from a server. This would allow the beacon to broadcast both static and dynamic inventory information.

In some embodiments, either the "second" or "third" inventory searches as described above may be omitted in part or in whole. For example, a system could provide improved inventory searching using a combination of location-based searching and beacon-based searching (but not computer vision-based searching). In particular, when the user opens or launches an app on their user device, the app may determine the current location of the user device and send a request to a server device for information about vehicles located at nearby dealerships. The app can store the resulting inventory information on the user device. Later, the app may determine the user device is located at a particular dealership. The app can receive beacon data from beacons affixed to nearby vehicles and correlate the beacon data with the stored inventory information to allow the user to browse/search nearby vehicles (thus providing highly localized and relevant information without requiring multiple server requests). As another example, a system could provide improved inventory searching using a combination of location-based searching and computer vision-based searching (but not beacon-based searching). In particular, the app can correlate image classification information with stored inventory information (i.e., information retrieved during a "first" search) in order to identify a particular inventory item captured by the user device's camera.

Figure 4:
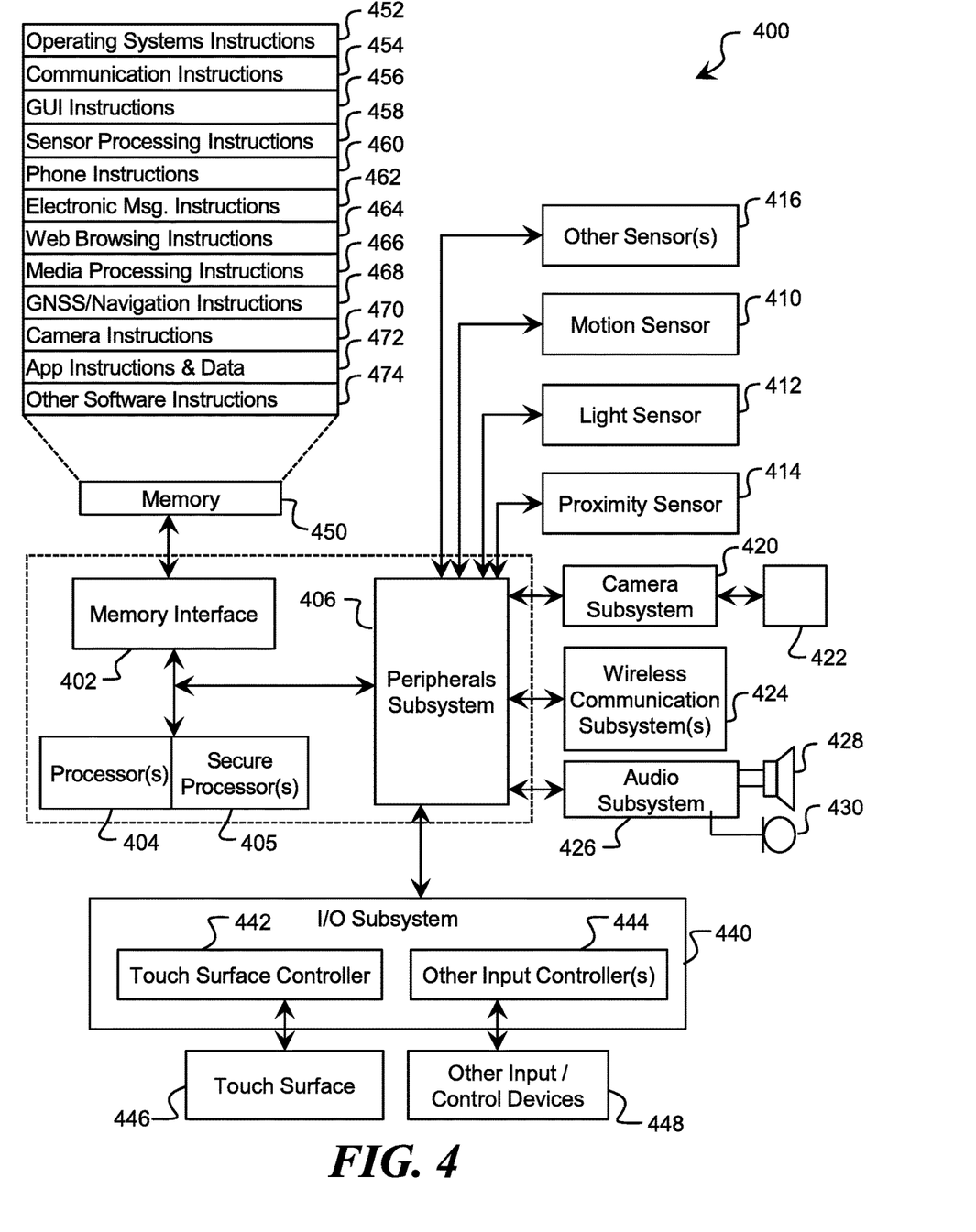
FIG. 4 is a block diagram of a user device, according to some embodiments of the present disclosure.

FIG. 4 shows a user device 400, according to an embodiment of the present disclosure. The illustrative user device 400 may include a memory interface 402, one or more data processors, image processors, central processing units 404, and/or secure processing units 405, and a peripherals interface 406. The memory interface 402, the one or more processors 404 and/or secure processors 405, and/or the peripherals interface 406 may be separate components or may be integrated in one or more integrated circuits. The various components in the user device 400 may be coupled by one or more communication buses or signal lines.

Sensors, devices, and subsystems may be coupled to the peripherals interface 406 to facilitate multiple functionalities. For example, a motion sensor 410, a light sensor 412, and a proximity sensor 414 may be coupled to the peripherals interface 406 to facilitate orientation, lighting, and proximity functions. Other sensors 416 may also be connected to the peripherals interface 406, such as a global navigation satellite system (GNSS) (e.g., GPS receiver), a temperature sensor, a biometric sensor, magnetometer, or other sensing device, to facilitate related functionalities.

A camera subsystem 420 and an optical sensor 422, e.g., a charged coupled device (CCD) or a complementary metal-oxide semiconductor (CMOS) optical sensor, may be utilized to facilitate camera functions, such as recording photographs and video clips. The camera subsystem 420 and the optical sensor 422 may be used to collect images of a vehicle to be classified by the process outlined in blocks 310-312.

Communication functions may be facilitated through one or more wired and/or wireless communication subsystems 424, which can include radio frequency receivers and transmitters and/or optical (e.g., infrared) receivers and transmitters. For example, the Bluetooth (e.g., Bluetooth low energy (BLE)) and/or WiFi communications described herein may be handled by wireless communication subsystems 424. The specific design and implementation of the communication subsystems 424 may depend on the communication network(s) over which the user device 400 is intended to operate. For example, user device 400 may include communication subsystems 424 designed to operate over a GSM network, a GPRS network, an EDGE network, a WiFi or WiMax network, an LTE network, an LTE-M network, and a Bluetooth™ network. For example, the wireless communication subsystems 424 may include hosting protocols such that the device 400 can be configured as a base station for other wireless devices and/or to provide a WiFi service.

An audio subsystem 426 may be coupled to a speaker 428 and a microphone 430 to facilitate voice-enabled functions, such as speaker recognition, voice replication, digital recording, telephony functions, and voice prompts or assistance to the user. The audio subsystem 426 may be configured to facilitate processing voice commands, voiceprinting, and voice authentication, for example.

The I/O subsystem 440 may include a touch-surface controller 442 and/or other input controller(s) 444. The touch-surface controller 442 may be coupled to a touch surface 446. The touch surface 446 and touch-surface controller 442 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 446.

The other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of the speaker 428 and/or the microphone 430.

In some implementations, a pressing of the button for a first duration may disengage a lock of the touch surface 446; and a pressing of the button for a second duration that is longer than the first duration may turn power to user device 400 on or off. Pressing the button for a third duration may activate a voice control, or voice command, module that enables the user to speak commands into the microphone 430 to cause the device to execute the spoken command. The user may customize a functionality of one or more of the buttons. The touch surface 446 can, for example, also be used to implement virtual or soft buttons and/or a keyboard.

In some implementations, user device 400 may present recorded audio and/or video files, such as MP3, AAC, and MPEG files. In some implementations, user device 400 may include the functionality of an MP3 player, such as an iPod™. User device 400 may, therefore, include a 36-pin connector and/or 8-pin connector that is compatible with the iPod. Other input/output and control devices may also be used.

The memory interface 402 may be coupled to memory 450. The memory 450 may include high-speed random access memory and/or non-volatile memory, such as one or more magnetic disk storage devices, one or more optical storage devices, and/or flash memory (e.g., NAND, NOR). The memory 450 may store an operating system 452, such as Darwin, RTXC, LINUX, UNIX, OS X, WINDOWS, or an embedded operating system such as VxWorks.

The operating system 452 may include instructions for handling basic system services and for performing hardware dependent tasks. In some implementations, the operating system 452 may be a kernel (e.g., UNIX kernel). In some implementations, the operating system 452 may include instructions for performing voice authentication.

The memory 450 may also store communication instructions 454 to facilitate communicating with one or more additional devices, one or more computers and/or one or more servers. The memory 450 may include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GNSS/Navigation instructions 468 to facilitate GNSS and navigation-related processes and instructions; and/or camera instructions 470 to facilitate camera-related processes and functions. The memory 450 may store instructions and data 472 for one or more apps, such as app 122 of FIG. 1, along with other software instructions 474.

Each of the above identified instructions and applications may correspond to a set of instructions for performing one or more functions described herein. These instructions need not be implemented as separate software programs, procedures, or modules. The memory 450 may include additional instructions or fewer instructions. Furthermore, various functions of user device 400 may be implemented in hardware and/or in software, including in one or more signal processing and/or application specific integrated circuits.

In some embodiments, processor 404 may perform processing including executing instructions stored in memory 450, and secure processor 405 may perform some processing in a secure environment that may be inaccessible to other components of user device 400. For example, secure processor 405 may include cryptographic algorithms on board, hardware encryption, and physical tamper proofing. Secure processor 405 may be manufactured in secure facilities. Secure processor 405 may encrypt data/challenges from external devices. Secure processor 405 may encrypt entire data packages that may be sent from user device 400 to the network. Secure processor 405 may separate a valid user/external device from a spoofed one, since a hacked or spoofed device may not have the private keys necessary to encrypt/decrypt, hash, or digitally sign data, as described herein.

Figure 5:
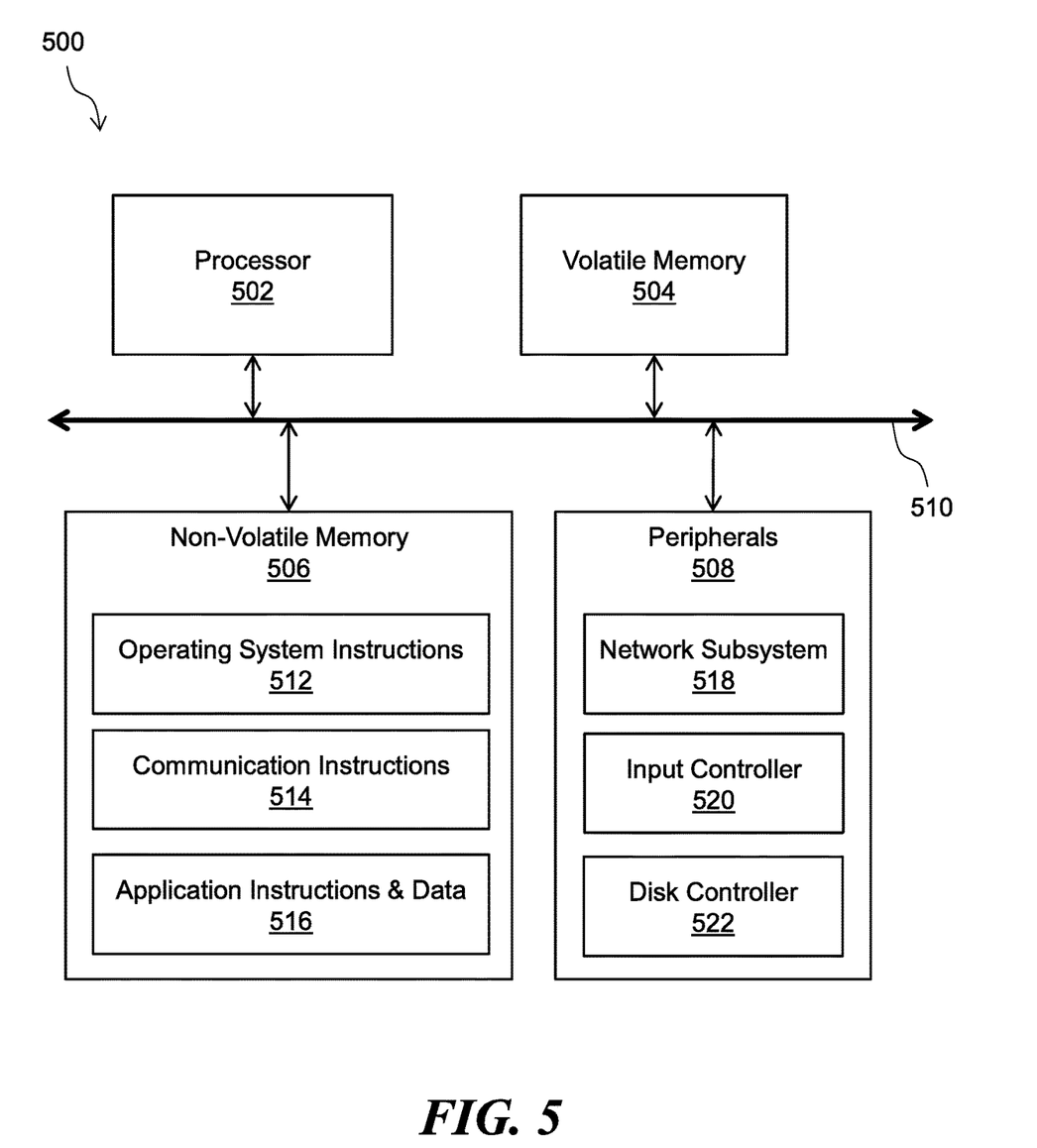
FIG. 5 is a block diagram of a server device, according to some embodiments of the present disclosure.

FIG. 5 shows an illustrative server device 500 that may implement various features and processes as described herein. The server device 500 may be implemented on any electronic device that runs software applications derived from compiled instructions, including without limitation personal computers, servers, smart phones, media players, electronic tablets, game consoles, email devices, etc. In some implementations, the server device 500 may include one or more processors 502, volatile memory 504, non-volatile memory 506, and one or more peripherals 508. These components may be interconnected by one or more computer buses 510.

Processor(s) 502 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 510 may be any known internal or external bus technology, including but not limited to ISA, EISA, PCI, PCI Express, NuBus, USB, Serial ATA or FireWire. Volatile memory 504 may include, for example, SDRAM. Processor 502 may receive instructions and data from a read-only memory or a random access memory or both. The essential elements of a computer may include a processor for executing instructions and one or more memories for storing instructions and data.

Non-volatile memory 506 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 506 may store various computer instructions including operating system instructions 512, communication instructions 514, and application instructions and data 516. Operating system instructions 512 may include instructions for implementing an operating system (e.g., Mac OS®, Windows®, or Linux). The operating system may be multi-user, multiprocessing, multitasking, multithreading, real-time, and the like. The operating system instructions 512 may include network communications instructions, for example, software for implementing communication protocols, such as TCP/IP, HTTP, Ethernet, telephony, etc. Application instructions and data 516 can include, for example, instructions for server modules 108-112 described above in conjunction with FIG. 1.

Peripherals 508 may be included within the server device 500 or operatively coupled to communicate with the sever device 500. Peripherals 508 may include, for example, network interfaces 518, input devices 520, and storage devices 522. Network interfaces may include for example an Ethernet or WiFi adapter. Input devices 520 may be any known input device technology, including but not limited to a keyboard (including a virtual keyboard), mouse, track ball, and touch-sensitive pad or display. Storage devices 522 may include one or more mass storage devices for storing data files; such devices include magnetic disks, such as internal hard disks and removable disks; magneto-optical disks; and optical disks.

Methods described herein may represent processing that occurs within a client-server system, such as system 100 of FIG. 1. The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method for improved efficiency of an inventory management system, the method comprising:
 receiving, at a user device, one or more inventory search criteria, the inventory search criteria comprising at least a location criterion;
 prompting, by the user device, a remote server to perform a first inventory search of inventory data stored in a database using the search criteria, the inventory data comprising a location for each of a plurality of inventory items, the first inventory search comprising at least a geospatial search of the stored inventory data using the location criterion;
 receiving, at the user device from the remote server, a list of search results;
 automatically detecting, by the user device, that the user device is collocated with a facility associated with the inventory management system;
 receiving, from a beacon sensor of the user device, inventory data broadcast from a plurality of beacons associated with the facility, each of the beacons being collocated with a corresponding one of the plurality of inventory items;
 performing a second inventory search by correlating the inventory data broadcast from the plurality of beacons with results of the first inventory search;
 receiving image data from a camera of the user device, the image data comprising image data for an inventory item within a field-of-view of the camera;
 performing image classification on the image data to determine one or more class labels for the inventory item within the field-of-view of the camera;
 performing a third inventory search by correlating the class labels with results of the second inventory search; and
 presenting, by the user device, results of the third inventory search, the presented information comprising inventory data corresponding to at least one search result from the list of search results retrieved from the database during the first inventory search.

2. The method of claim 1 wherein performing the first inventory search comprises:
 sending a search request comprising the search criteria to a server device, wherein the server device performs the geospatial search of the stored inventory data.

3. The method of claim 1 wherein the stored inventory data comprises a unique identifier for each of the plurality of inventory items, wherein performing the second inventory search comprises matching unique identifiers broadcast from the plurality of beacons to unique identifiers within the results of the first inventory search.

4. The method of claim 1 wherein the stored inventory data comprises descriptive information for each of the plurality of inventory items, wherein presenting the results of the third inventory search comprises presenting the descriptive information for one or more of the plurality of inventory items.

5. The method of claim 1 wherein the stored inventory data comprises a sales price for each of the plurality of inventory items.

6. The method of claim 1 comprising:
 storing the results of the first inventory search to a non-volatile memory of the user device,
 wherein presenting the results of the third inventory search comprises using the results of the first inventory search stored to the non-volatile memory of the user device.

7. The method of claim 1 wherein the location criterion comprises at least one of:
 a location and search radius;
 one or more zip codes; and
 one or more locality names.

8. The method of claim 1 wherein the location criterion comprises coordinates determined by a location sensor of the user device.

9. The method of claim 1 wherein the plurality of inventory items comprises a plurality of vehicles.

10. The method of claim 9 wherein the stored inventory data comprises a Vehicle Identification Number (VIN) for each of the plurality of vehicles.

11. The method of claim 9 wherein the stored inventory data comprises a make, model, and year for each of the plurality of vehicles.

12. The method of claim 1 wherein the stored inventory data comprises third party review information for one or more of the plurality of inventory items.

13. A method for improved efficiency of an inventory management system, the method comprising:
- determining a location of a user device using a location sensor;
- receiving search results from a server device, the first search results comprising information for a plurality of inventory items within a predetermined distance from the determined location, the first search results comprising a unique identifier and descriptive information for each of the inventory items;
- automatically detecting that the user is collocated with a facility associated with the inventory management system;
- receiving signals broadcast from a plurality of beacons associated with the facility, each of the beacons collocated with a corresponding one of the plurality of inventory items, each of the beacons broadcasting a unique identifier for the corresponding inventory item;
- narrowing the search results using the unique identifiers broadcast from the plurality of beacons; and
- presenting a user interface (UI) to display the narrowed search results to a user of the user device.

14. The method of claim 13 comprising:
- receiving image data from a camera of the user device;
- performing image classification on the image data to determine one or more class labels for an inventory item within the field-of-view of the camera;
- further narrowing the search results using the one or more class labels; and
- presenting the UI to display the further narrowed search results to the user.

15. The method of claim 13 comprising:
- sending a search request comprising the location to the server device.

16. The method of claim 13 wherein the server device is coupled to a database configured to store inventory data for the plurality of inventory items.

17. The method of claim 16 wherein the stored inventory data comprises a sales price and a location for each of the plurality of inventory items.

18. The method of claim 13 wherein the plurality of inventory items comprises a plurality of vehicles.

19. The method of claim 18 wherein the stored inventory data comprises a Vehicle Identification Number (VIN) for each of the plurality of vehicles.

20. A device comprising:
- a beacon sensor;
- a camera;
- a processor; and
- a user application configured for execution on the processor to:
  - receive one or more inventory search criteria, the inventory search criteria comprising at least a location criterion;
  - prompt a remote server to perform a first inventory search of inventory data stored in a database using the search criteria, the inventory data comprising a location for each of a plurality of inventory items, the first inventory search comprising at least a geospatial search of the stored inventory data using the location criterion;
  - receive information for a plurality of inventory items by receiving, using the beacon sensor, signals broadcast from a plurality of beacons, each of the beacons collocated with a corresponding one of the plurality of inventory items, each of the beacons broadcasting at least a unique identifier for the corresponding inventory item;
  - perform a second inventory search by correlating the inventory data broadcast from the plurality of beacons with results of the first inventory search;
  - receive image data from the camera;
  - perform image classification on the image data to determine one or more class labels for an inventory item within the field-of-view of the camera;
  - select a first one of the plurality of inventory items using the one or more class labels; and
  - present a user interface (UI) to display the descriptive information for the first one of the plurality of inventory items.

* * * * *